United States Patent [19]

Chumley

[11] Patent Number: 4,498,418
[45] Date of Patent: Feb. 12, 1985

[54] CATTLE CAR

[76] Inventor: Claude Chumley, P.O. Box 213, Harrogate, Tenn. 37752

[21] Appl. No.: 439,790

[22] Filed: Nov. 8, 1982

[51] Int. Cl.³ ............................ B60P 3/04; B61D 3/04
[52] U.S. Cl. ......................................... 119/10; 105/372
[58] Field of Search ............................ 119/7, 8, 9, 10; 105/370, 372

[56] References Cited

U.S. PATENT DOCUMENTS

| | | | |
|---|---|---|---|
| 236,332 | 1/1881 | Hunt | 119/10 |
| 565,835 | 8/1896 | Burke et al. | 105/372 |
| 1,097,304 | 5/1914 | Cottrell | 119/9 |
| 2,498,647 | 2/1950 | Burnam | 119/10 |
| 2,595,337 | 5/1952 | Coyner | 119/10 |
| 3,746,388 | 7/1973 | Robinson | 105/409 X |
| 3,901,193 | 8/1975 | Gehlbach | 119/52 AF |

Primary Examiner—Robert P. Swiatek
Attorney, Agent, or Firm—James C. Kesterson

[57] ABSTRACT

A vehicle for the long distance and humane transporting of livestock in which the vehicle is alternately suitable for the transporting of bulk particulate or granular matter as well as other cargo is disclosed. The vehicle (10) includes wheels such as wheels (12,14) for a train or for a truck trailer. An enclosing structure (20) for housing livestock is tightly joined to the support platform (48) such that the resulting enclosure is suitable for maintaining a selected environment. Entryway (26) and the window apertures (22,24) further include doors or windows which can be tightly closed to maintain the selective environment. An environmental system (41) is also included for maintaining the temperature and other environmental parameters at preselected levels. The animals are fed and watered by means of open containers (70 through 76) secured to the sidewalls (54,56) of the enclosure. There also are included first (94) and second (95) storage containers for storing the feed and water respectively. The environmental control system (41) is automatically controlled by a master control (95) which in a preferred embodiment is located in a separated area provided as human quarters. Also, the two support floors of the transporting vehicle may be moved such that after the vehicle is completely cleaned after transporting livestock, it may then be used as a closed container for transporting grains or other granular or particulate materials.

12 Claims, 8 Drawing Figures

CATTLE CAR

DESCRIPTION

1. Technical Field

This invention relates generally to the transporting of livestock and more particularly to apparatus and methods for the humane and safe transporting of livestock by means of railroad cars and/or highway vehicles. The transporting vehicle of this invention constitutes a significant improvement over the inhumane transporting techniques of the past which often resulted in significant loss of life of the animals being transported as well as a large number of sick and ill animals.

2. Background Art

As will be appreciated by anyone skilled or knowledgeable of the livestock and/or cattle industry, one of the major problems facing the industry is that that the raising of animals and livestock for human consumption often takes place at locations which are distantly removed from the meat processing plants. As a result, the transporting of live animals from the location where they are raised to the processing plants has been in the past, and is today one of the major considerations in the industry. This problem, of course, has existed throughout the life span of the industry, and is memorialized in many history books, movies, and the like by records of the great cattle drives of the past. As was recognized by the cattle raisers of many years ago, a cattle drive was a long and difficult trip that often resulted in only a small portion of the cattle which started the drive surviving until the end of the drive. That is, many of the cattle were killed, died or were otherwise lost in the mass movement of the cattle. In addition, those cattle which did survive the drive were often sick and substantially emaciated due to the unavailability of sufficient food and water during the drive. Thus, the total weight of delivered livestock at the end of the cattle drive bore little or no relationship to the beginning total weight of the cattle.

Surprisingly enough, although the mass transporting of cattle and livestock today is normally accomplished by means of railroad and truck cattle cars, there is still a substantial number of cattle that die in route, and the cattle that do survive the transporting process are delivered in a very sick or weakened condition. In addition, all of the cattle which do survive and are delivered will have sustained substantial weight loss. It will be appreciated, of course, that the loss of cattle in route, the delivery of sick cattle, and the delivery of cattle which have sustained weight loss does result in a significant economic loss to the cattle industry. Thus, it will be appreciated that a technique for the transporting of cattle and livestock which substantially reduces the number of cattle dying en route, the number of cattle which are delivered ill, and the weight loss of the delivered cattle would not only be of great economic value to the cattle industry, but would also mean a significantly improved and more humane technique of transporting cattle and livestock.

As will be appreciated by those skilled in the cattle transporting industry, today's techniques of rail and truck transportation of cattle have not significantly changed in the last 50 years. For example, the cattle are simply crowded as tightly as possible into cattle cars which are completely open to the environment and which do not provide either food or water for the cattle. Further, ICC regulations only require that the cattle be released from these open cattle cars every 28 hours for food and water. It will, of course, be appreciated that in extreme heat or cold, suffering of the cattle being transported is most severe. Further, because of the extreme conditions under which the cattle are transported, any cattle that suffers any type of illness has little chance of survival. This is especially true if the cattle falls to the floor of the transporting vehicle, since the fallen animal may be continuously stepped on by the standing cattle. Although some difference do exist with respect to the transporting of cattle by means of roadway vehicles or trucks, as opposed to the transporting of cattle by railroad vehicles, conditions are sufficiently similar and just as primitive so that the overall deleterious effect on the cattle is the same. Thus, it is clearly seen that new and more humane methods of transporting livestock and cattle is urgently needed.

With respect to the humane transporting of live animals of substantial size such as cattle, perhaps the only available vehicle, are the one or two horse transporting vehicles used in the transporting of expensive horses such as race horses and show horses. These vehicles, of course, would be completely inadequate and unacceptably expensive for the transporting of thousands and thousands of livestock used for consumption.

Another factor which increases the cost of transportation of livestock and cattle, is the fact that the railroad cars and trucks used for such transporting have substantially no other use. This is true, even though the cattle transporting vehicles have been thoroughly washed down and cleaned after the cattle have been removed. In some instances, the cars could be used for the transporting of lightweight bulky packages or articles, but typically the cars unlike most box cars and railroad cars and trucks are returned from the point at which the cattle were delivered completely empty. That is, the cattle cars typically are only used in a single direction and therefore may be used only half as often as other types of railroad and truck vehicles. This one way transporting is, of course, because the sides of the cars are completely open to the atmosphere so that the cattle may receive some ventilation and therefore the cars are completely restricted as to types of other cargo they could carry. It is particularly clear that such cars available today can in no way carry bulk cargo items such as grains and other particulate matter. Since cattle are often delivered from ranches to the midwest feedlots where great supplies of grain are available, it would be of great value if the transporting cars could, on their return trip, be filled with grain or the like in such a manner that the grain could be transported to other areas and especially to the ranches from which the cattle originated.

Therefore, it is an object of the present invention to provide apparatus and methods for the safe and humane transporting of livestock.

Therefore, it is still another object of this invention to provide methods and apparatus for providing the transporting of livestock whereby the livestock have continuing access to food and water.

It is yet another object of the present invention to provide methods and apparatus for the transporting of livestock which protects the transported animals from extremes in weather conditions.

It is also an object of this invention to provide methods and apparatus which allow the transporting of animals and livestock in a manner whereby the animals arrive without the excess loss of weight.

It is still another object of the present invention to provide a cattle transporting vehicle which can alternately be used for the transporting of particulate and/or granular materials.

DISCLOSURE OF THE INVENTION

Other objects and advantages will in part be obvious, and will in part appear hereinafter, and will be accomplished by the present invention which provides a vehicle for the long distance and humane transporting of livestock which vehicle can alternately be used for the transporting of bulk, particulate or granular matter. The vehicle comprises a substantially rectangular shaped support platform including wheel means such as for example railroad wheels or wheels of the type used on the trailer of a large truck to allow movement of the support platform over a selected route or roadway. The support platform is typically rectangular and will therefore have a long dimension and a short dimension, and will define a selected perimeter. An enclosing structure suitable for housing livestock includes a pair of side walls, a pair of end walls and a top. The side walls and end walls define a base of the enclosing structure which has the same shape as the selected perimeter of the support platform and which is joined to the support platform in such a manner that the enclosing structure and the platform comprise a complete enclosure suitable for maintaining a closed environment. The enclosing structure defines at least one entry way suitable for loading cattle into the vehicle. Also included are a multiplicity of apertures such as power operated windows which selectively provide light and ventilation to the interior of the enclosing structure. The window apertures and the entry way include means for closing these openings in a tight manner to protect the selected environment from the outside climate and weather. An environmental control system is also provided such that the selected environment and temperature may be created as necessary. In addition to temperature, other environmental parameters such as humidity, oxygen level, etc., may also be controlled. A multiplicity of open containers are secured to the side walls which allow free access by livestock in the enclosure to feed and water contained in these open containers. Also included is a first and second storage container for storing the feed and water in bulk form. Means such as an auger which rotates within a conduit is used to move the feed from the first storage container to selected ones of the open containers. In a similar manner, water is provided through piping to other selected ones of the multiplicity of open containers. Also included, is a master control means or panel which controls the environmental system and the means for providing feed and water to the containers. In a preferred embodiment of the invention, the enclosing structure vehicle will also include human living quarters which are completely separate from the livestock. In this embodiment, the living quarters also include the master control means so that the enclosing structure for the animals may be monitored and controlled. Furthermore, in most rail vehicles and truck vehicles the cars or transporting vehicles will include an upper support floor such that the floor area for the cattle may be doubled and therefore twice as many cattle transported. Also, to allow the transporting vehicle to be used for other purposes, in a preferred embodiment, the upper floor comprises two halves which are pivoted or hinged to the side walls of the vehicle and which include power actuating means such that the floor may be moved up and out of the way to allow the structure to be changed from a compartmentalized enclosing structure for the livestock to a large single open structure. In addition, the bottom support floor is also divided into two halves which are separate but which contact each other proximate the center line along the long dimension of the vehicle when the lower floor is in its cattle transporting position. These halves are also attached to power actuating means such that when the outside portion of the floor halves are lifted, the bottom floor slopes inwardly toward the center of the car so that particulate materials or granular materials may be loaded in the vehicle. These materials will tend to fall towards the bottom center line of the vehicle where they can be moved by means of augers lying along the center line of the vehicle, and then discharged from a discharge chute.

BRIEF DESCRIPTION OF THE DRAWINGS

The above mentioned features of the present invention will be more clearly understood from the consideration of the following description in connection with the accompanying drawings in which:

FIG. 6 is a perspective view illustrating how the features discussed with respect to the above figures may be combined in a vehicle suitable for use over the highways and pulled by a highway tractor.

BEST MODE FOR CARRYING OUT THE INVENTION

Figure 1:
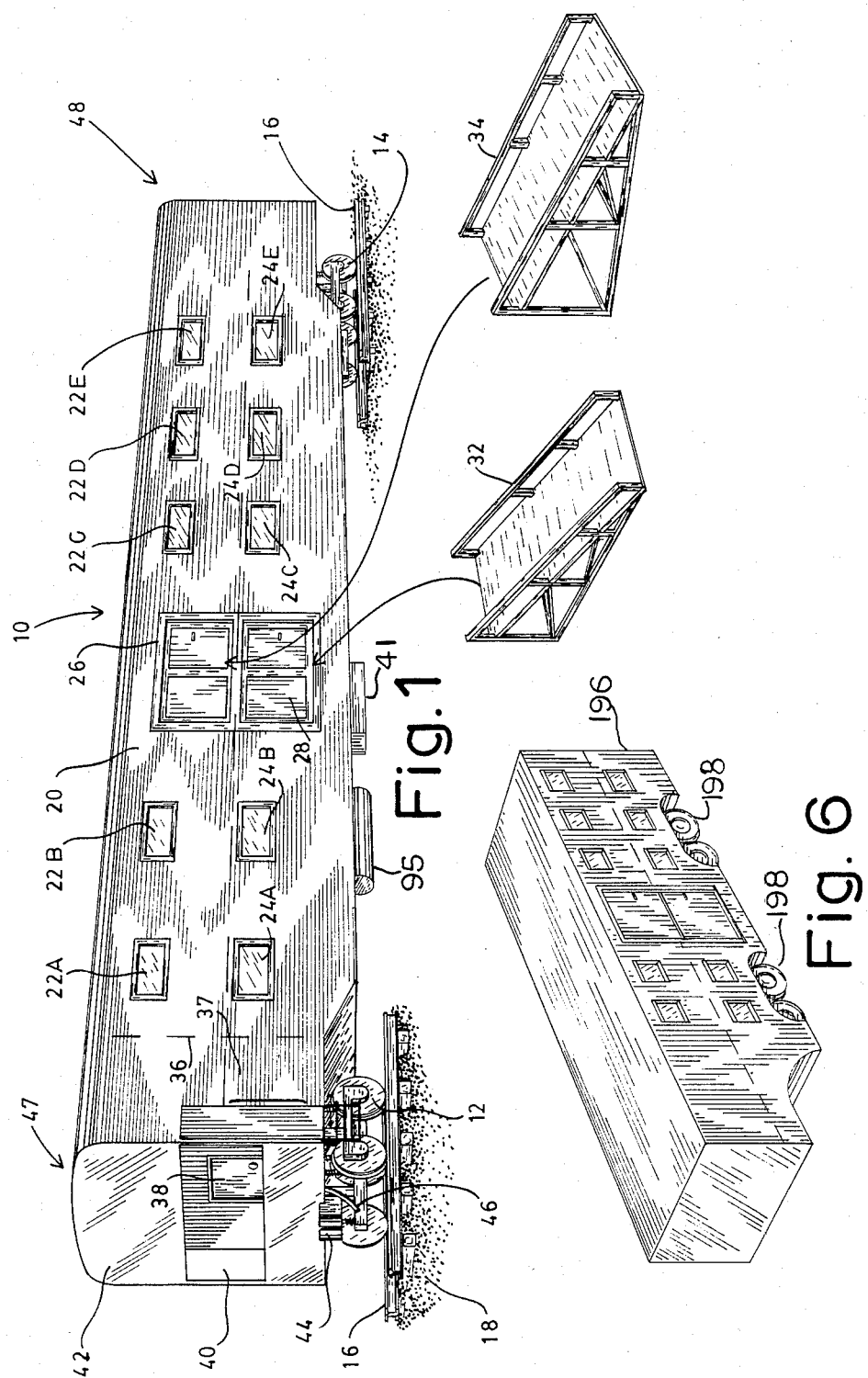
FIG. 1 is a perspective view of the vehicle of this invention suitable for transporting livestock by rail.

Referring now to FIG. 1, there is shown generally at 10 a vehicle for transporting livestock over railroad track. As shown, the vehicle 10 includes wheel means 12 and 14 which ride on railroad tracks 16 laid on a railroad bed 18. In the embodiment of FIG. 1, the vehicle includes an enclosing structure 20 which structure defines apertures such as upper windows 22A through 22E and lower windows 24A through 24E. As will be discussed hereinafter, these windows are primarily provided for allowing light into the interior of the enclosure and may be closed substantially airtight. However, during days having mild weather, they may be used for ventilation and allowing fresh air into the enclosure. Also included is an entry way 26 which may comprise a single door or as in the embodiment shown, may comprise a lower door 28 and an upper door 30. As will be discussed in detail hereinafter, the need for an upper and lower door exists because the transporting vehicle 10 will typically be two storied in that cattle or other livestock will be transported in a lower level which is accessed by door 28 by means of a low ramp 32 and in an upper level accessed through door 30 by means of a steeper ramp 34. The necessary ramps or cattle walks to the upper and lower level are, of course, already well known in the cattle transporting field and need not be discussed further at this time. Also in the embodiment shown and as will be discussed hereinafter, the livestock transporting vehicle of FIG. 1 also includes an area separated from the area containing the livestock or cattle as is indicated by phantom line 36. This separate area includes living quarters 37 so that a human attendant can ride with the cattle. Thus, the cattle can be monitored and assured proper feeding and watering. Also, of course, the cattle maybe attended to if they were to fall. In the embodiment shown, the human living quarters 37 are accessed by an outside door 38 which leads from a porch area 40 to the interior of the quarters. To assure a healthy and comfortable environment within the enclosure 20, there is included an environmental control unit 41 for providing heating and cooling. Environmental unit 41 may typically be a heat pump or a furnace heating unit and air conditioning unit. Also as shown, and as will be discussed hereinafter, the area above the living quarters 37 for the attendant may typically be used as a storage bin 42 for grain and or feed for feeding the livestock in the enclosure 20. The car 10 shown in FIG. 1 may of course be connected by coupling means 44 and air hose 46 at end 47 to any locomotive or train in the normal manner. End 48 of car 22 will also include couplings and connecting hoses (not shown) for further connecting to other railroad cars which may either be cattle cars of a similar nature or any other type of railroad cars.

Figure 2:
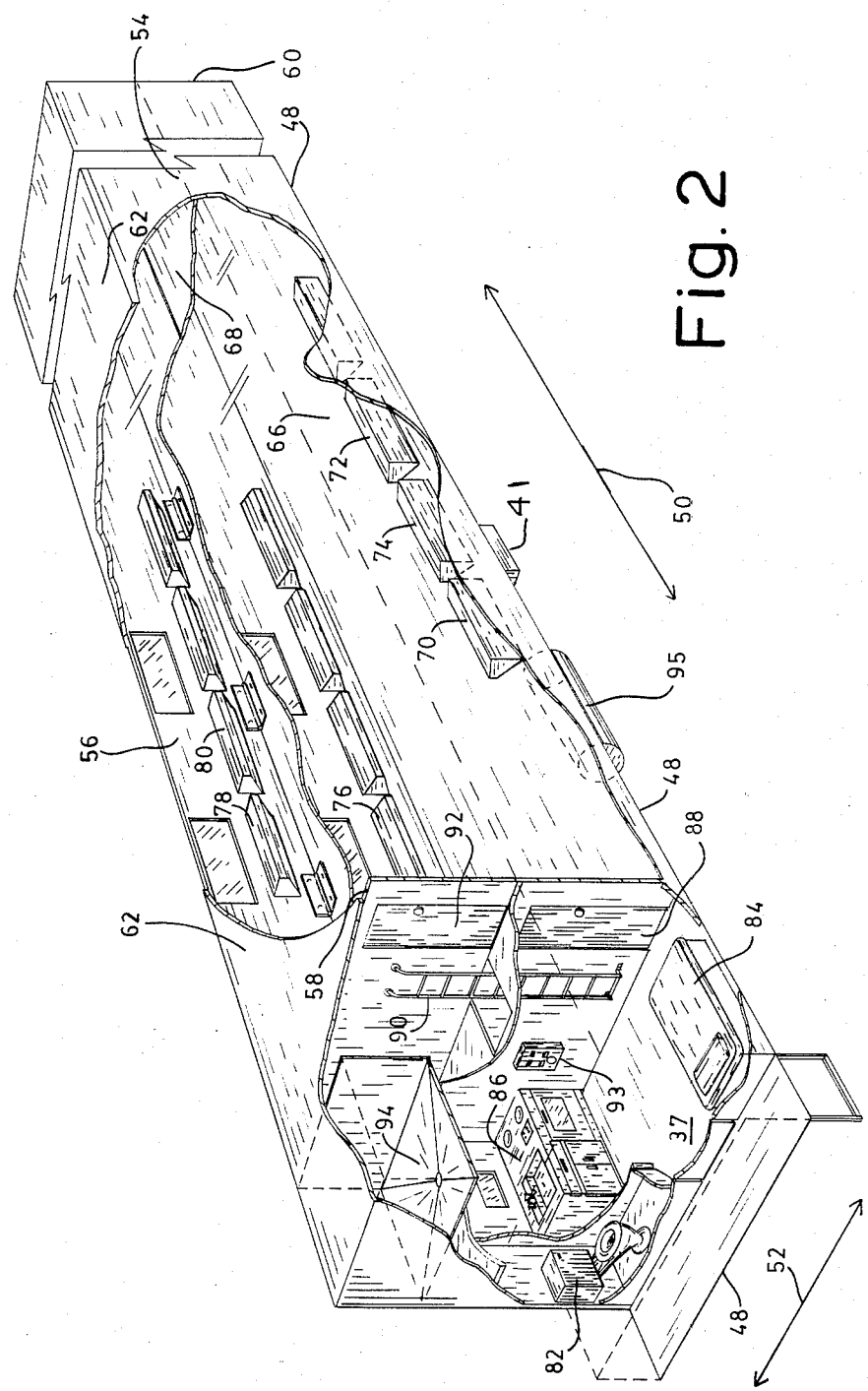
FIG. 2 is a perspective, partially cutaway view of the vehicle of FIG. 1 showing details of the vehicle of this invention.

Referring now to FIG. 2, there is shown a perspective and cutaway view of the livestock transporting vehicle 10 of FIG. 1. As shown, vehicle 10 includes a support platform 48 which is attached to the wheels 12 and 14 as discussed heretofore. As can be seen, support platform 48 includes a long dimension represented by arrow 50 and a short dimension represented by arrow 52. Further as shown, the enclosing structure 20 includes a pair of side walls 54 and 56, a pair of end walls 58 and 60, and a top member 62. Thus, the enclosure 20 is comprised of these end and side walls and top member such that the base or bottom portion of the end walls and side walls define a selected perimeter which is joined to support platform 48 so that an enclosed environment may be maintained within the space formed by enclosing structure 20 and the supporting platform 48.

Figure 3:
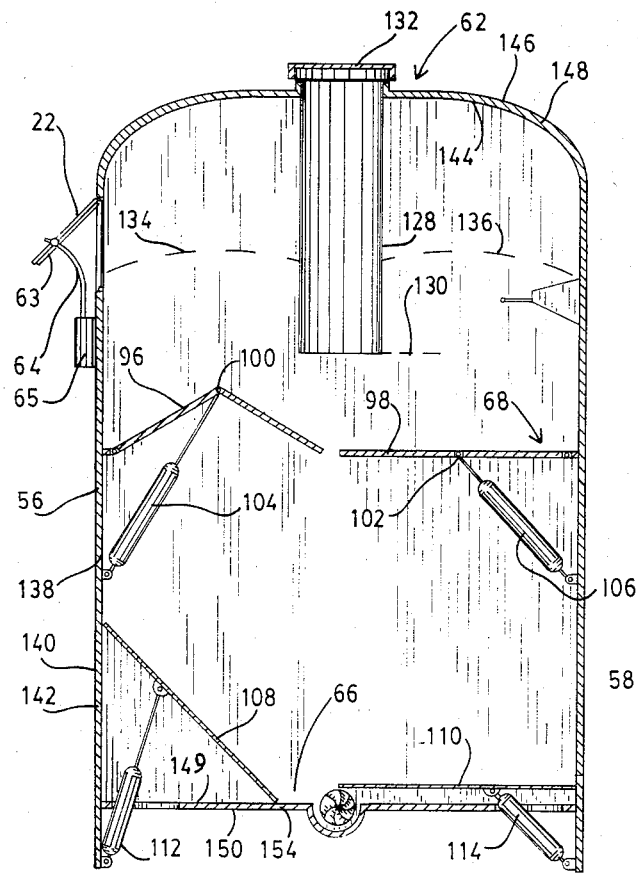
FIG. 3 is a cross-section of the vehicle of FIG. 2 showing the power actuated, and folding support floors.

As was mentioned, heretofore, the windows are primarily for allowing light into the interior of the enclosure and consequently are tightly sealed when closed to help protect the enclosed structure from the exterior climate and weather conditions. However, during days having mild weather, the windows may be opened to allow fresh air and ventilation and thereby avoid the necessity of using the environmental control systems. For ease of control, at least a portion of the windows will be power actuated so they can be controlled remotely and automatically from a central control point. As is shown in FIG. 3, the windows which may be opened, such as upper window 22 includes a seal 63, and are controlled by a linkage 64, and power unit 65. The power unit 65 itself is controlled from the control point. It will be appreciated, of course, that the linkage 64 and power unit 65 shown are for example only, and that any other type of power operated windows may be satisfactory, such as for example windows which move up and down such as in an automobile. In addition, the power unit 65 could be an electrical, air or hydraulic system. Further the power unit 65 may well be concealed within the walls of the enclosing structure.

Referring again to FIG. 2 and as was discussed heretofore, the vehicle for transporting livestock which includes the features of this invention will preferably have a lower floor level 66 and a second support floor or upper floor 68 such that the cattle or livestock are transported in the vehicle in two levels. During transportation of the livestock, the livestock or cattle will have access to food and water by means of feed containers 70 and 72 and water container 74 located on side wall 54 and food container 76 located on side 56 at the lower level.

In a similar manner, the upper floor or section of the enclosure 20 having support floor 68, includes feed troughs and water troughs or containers supported on the side walls 54 and 56 in an alternating manner. In this respect, there is shown food container 78 and water container 80 mounted to side wall 56. Although it will be appreciated that these food and water troughs could be filled manually, as will be discussed hereinafter, more efficient and convenient automatic watering and feeding techniques are used which will be discussed in detail later.

Also in the preferred embodiment, the enclosure 20 includes human living quarters 37 which quarters are completely separate from the space or area housing the livestock or animals. Quarters 37 typically would include enclosed toilet facilities 82, a bunk or bed 84 and combined small stove and lavatory equipment 86. Also as shown, an entryway or door 88 may be provided such that the human attendant would have access to the cattle on the lower floor. In a similar manner there is included a ladder 90 for providing access to an upper door 92 such that the attendant may also have access to the cattle located on the upper level. Also included is a master control point or panel 93 which in most operations would be computerized for allowing automated control of the environment in the livestock areas and the human living quarters, control of the feed and water facilities in the livestock quarters, as well as control of the power actuated windows previously discussed. In addition, as is clearly seen in FIG. 2, the remaining area above the human living quarters 80 not taken up by the ladder 90 area and the door 92 is used as a feed storage bin 94 to provide storage of the feed provided to the feeding containers 70, 72, 76 and 78. The water storage container 95 may advantageously be supported below support platform 48 in a well known manner.

Figure 3A:
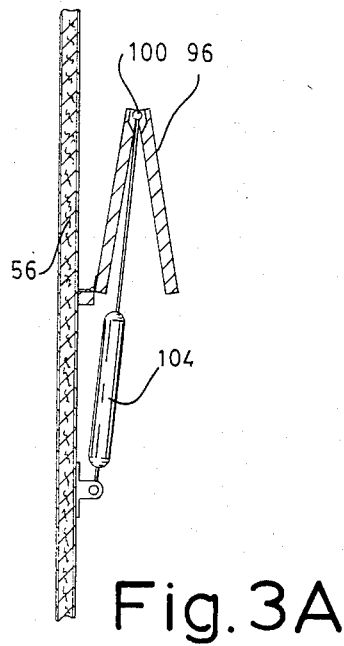
FIG. 3A shows details of the upper support floor and actuator in a full open position.

Thus, to this point there has been described a new and unique livestock transporting vehicle which allows for the humane transporting of the livestock in a controlled environment and which automatically provides food and water to the animals. However, as was discussed heretofore in the background of this application, the present vehicles for transporting livestock are substantially limited to that sole purpose. That is, because of the open walls on existing livestock vehicles, particulate and granular material such as grains and the like cannot be transported in present vehicles. However, referring now to FIG. 3 it will be appreciated that once the vehicle as discussed in FIG. 2 has transported the livestock and has subsequently been thoroughly cleaned it may well be suitable for the transporting of other type cargos and particularly suitable for particulate or granular materials such as grain. The ability to transport grain would be especially useful since processing and slaughter houses are typically located in the midwest while at the same time the midwest is the primary agricultural area for most wheat and other grains. Therefore, if the vehicle could be loaded with grain prior to being returned to its original starting point, it could readily carry the grain back to the farms and areas at which the cattle are raised, or to the heavily populated areas. To this end, the upper level support floor 68 is shown as being divided into a first and second half 96 and 98 respectively. Also as shown, half 96 and half 98 are each mounted by hinges to the side walls 56 and 58 respectively. Further, in the embodiment shown, each half is further divided, and connected by second hinges 100 and 102 and also has attached thereto, substantially at the location of hinges 100 and 102, hydraulic power actuating cylinders 104 and 106. Thus, when the actuating cylinders are in the contracted condition as shown by cylinder 106 on the right hand side, the upper support floor 68 will be parallel and in the condition necessary for transporting cattle. However, when the actuator is partially extended as shown by cylinder 104, the floor will be partially folded up and out of the way such that the enclosed structure now comprises only a single compartment rather than the upper and lower compartments which exist when the support floor is in its normal mode. Referring now to FIG. 3A, there is shown the floor with the actuator in its fully extended position which results in the floor being in a fully retracted position. Further, to enhance the ability to unload the vehicle if it is filled with grain, there is also included a lower support floor 66 divided into two sections 108 and 110 which have connected thereto a pair of power actuating cylinders 112 and 114. Thus, as shown, when the power actuating cylinder 114 is in the contracted state half 110 of the lower platform is flat against the floor and in the position necessary for the transporting of livestock. However, when the power actuator 112 is fully extended, the floor is moved such that it is in a sloping condition such as shown by the half 108. It will be appreciated that if both half 108 and half 110 were in the sloping position, grain would readily move toward the center line of the railroad car.

Figure 3B:
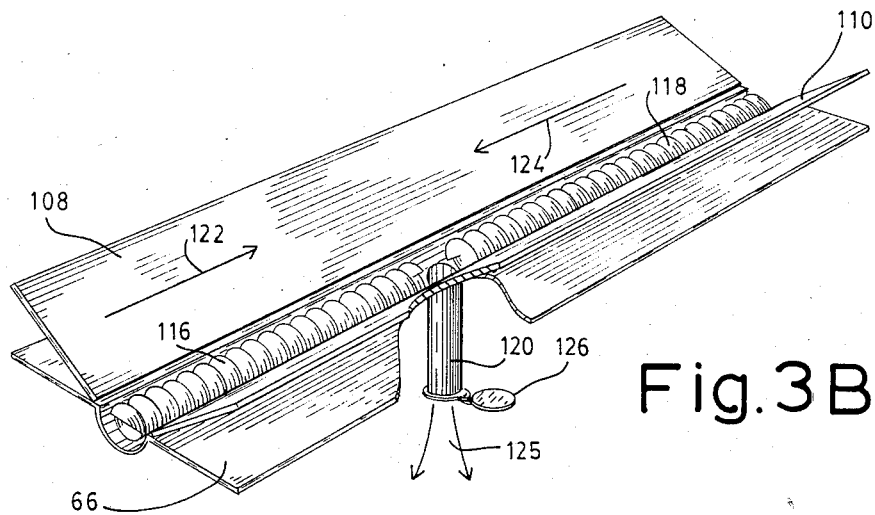
FIG. 3B shows details of the auger means for emptying grain from the vehicle.

Also as shown more clearly in FIG. 3B, to more efficiently remove grain that might be transported in the car, there is included an auger having a first section 116 and a second section 118. These auger sections rotate in opposite directions such that as an example auger 116 will move grain toward the center of the car to discharge chute 120 as indicated by arrow 122, and auger 118 will move grain to discharge chute 120 as indicated by arrow 124. Thus, it can be seen that once the car 10 is loaded with grain and then transported to its destination the grain may readily be removed or emptied from the car by simply removing a cover hatch 126 from discharge chute 120 with the augers engaged and powered such that they move in the direction of arrows 122 and 124 respectively. This means that as the grain 125 is discharged through chute 120 the grain from the two ends will also be moved toward the center of the car to the chute 120 thereby providing complete emptying or discharge of the grain.

In addition, although a car could be made sufficiently strong such that the vehicle could be completely filled from top to bottom with grain, it will be appreciated that for most uses, it may well be necessary to only fill the car 10 partly full with the particulate matter or grain to avoid excess weight or stresses to prevent rupturing of the enclosing structure. Thus, to this end, as shown in FIG. 3 a loading chute 128 extends from the top of the car 62 down to a selected distance or level 130. As shown the chute also includes a tight fitting cover 132. It will be appreciated that when the chute 128 is in place, and a material such as grain is loaded in the car, the car will fill completely up to a level approximately equivalent to that shown by phantom lines 134 and 136. When the grain has filled the vehicle to this level, the grain will then simply fill up the chute to indicate that the car is as full as it should be. Thus, by this simple technique, the level of particulate material and the weight carried in the car or vehicle may be controlled.

Also as can readily be seen from FIG. 3, it will be appreciated that if the vehicle 10 is to readily provide for a controlled environment inside, it will necessarily need good insulating qualities. To this end, it can be seen that side walls 56 and 58 include an inner shell 138 and an outer shell 140 filled with an insulating material 142. In a similar manner, top 62 also includes an inner shell 144 and an outer shell 146 and insulating material 148. Likewise, support platform 48 may also include an inner shell 149 and outer shell 150 and insulating material 154. In a preferred embodiment of this invention, testing has shown that an excellent enclosure can be made wherein the inner and outer shells are made of one quarter ($\frac{1}{4}$) inch aluminum, and wherein the shells are divided and separated by three (3) inches of styrofoam insulation.

Figure 4:
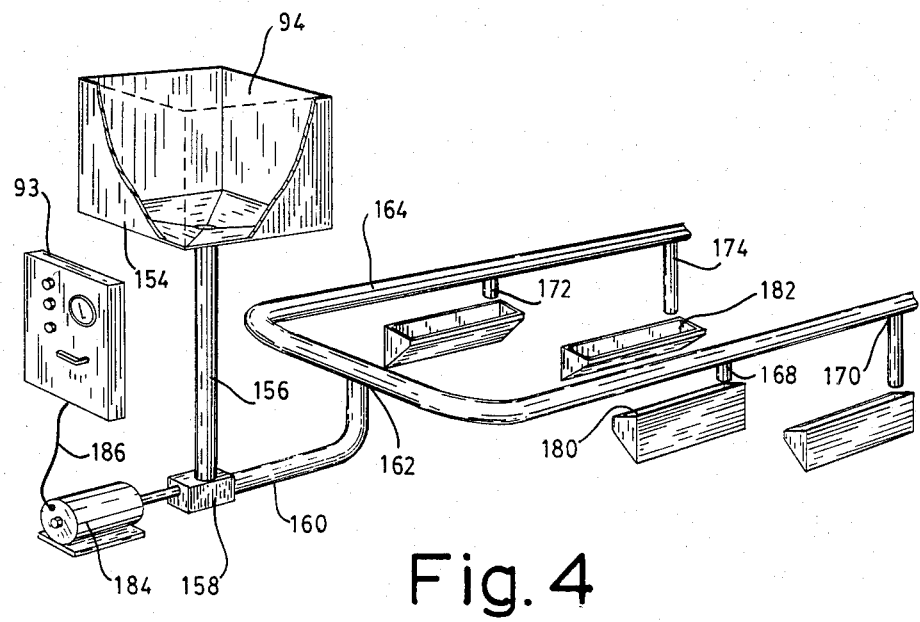
FIG. 4 illustrates the operation of the food hoppers and water containers of FIG. 2.

Referring now to FIG. 4, there is shown the bulk storage container 94 which in the present embodiment is used for storing feed for the cattle such as grain. In the embodiment shown, the bottom of container 94 has a sloping floor 154 towards a center discharge point 156 such that grain contained in container 94 will move by gravity towards discharge chute 156 where it is then picked up at end 158 of a conduit 160 which surrounds an auger (not shown) for moving the grain in a desired direction. At end 162 of conduit 160, two branches are provided along conduits 164 and 166 which move the grain close to the top 62 of the cattle car and on each side along side walls 54 and 56. The grain may then be moved the length of conduits 164 and 166 to discharge points such as discharge points 168 and 170 of conduit 166 and discharge points 172 and 174 of conduit 164. As can be seen, the grain is then free to fall from discharge point 168, for example, into open feed container 176 and from discharge point 170 into open feed container 178. In a similar manner, the grain is free to fall from discharge point 172 into container 180 and from discharge point 174 into container 182 which would be mounted along sidewall 56. Thus, it can be seen that the system of this invention includes a technique by which turning of the augers within conduits 160, 164, and 166 grains may readily be distributed to certain ones of the feeding troughs or open containers in the enclosure. To accomplish this, there is shown for example only, a power driving means 184 which is controlled by wires 186 from the master control panel 93 contained in the human living quarters.

Figure 5:
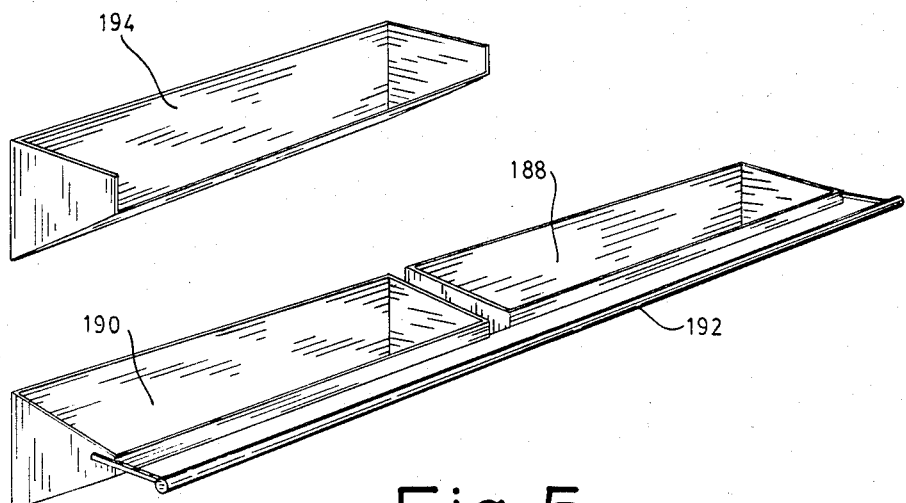
FIG. 5 illustrates further details of the feeding containers of the vehicle of FIG. 2.

FIG. 5 shows details of the feed and water containers which are mounted to the side walls of the enclosure. As shown, the feeding containers and watering containers are simply supported by the side wall at a level appropriate for the size livestock being transported. However, it will be noticed that there is included at the front of water container 188 and food container 190 a guard rail or manure rail 192 which operates to allow the livestock to reach with their head into the water and food containers but prevents the animals from fouling the food and water containers by their body waste. Also as is shown, it is typically desirable for livestock to have in their diet roughage which may readily be supplied by the hay rack 194 mounted above the food and water containers. The hay racks are not intended to substitute for the primary source of feed or grain, but merely provide some necessary roughage to the diet of the cattle.

To this point, it will be appreciated that the livestock transporting vehicle of this invention has been discussed with respect to a vehicle mounted on wheels suitable for use on a railroad track. However, it will further be appreciated that a similar type transporting vehicle may be suitable for highway transportation. To this end, as shown in FIG. 6, there is a double deck trailer 196 having wheels 198 suitable for traveling over a roadway or highway which can readily be pulled by a truck tractor not shown. The basic construction of the vehicle for road travel, would be substantially the same as that for railroad travel, except that it would not always be necessary to include human living quarters as the tractor cab commonly furnishes such quarters.

Thus, although the present invention has been described with respect to specific methods and apparatus for providing an improved vehicle for transporting livestock, it is not intended that such specific references be considered limitations upon the scope of this invention except as insofar as is set forth in the following claims.

I claim:

1. A vehicle for the long distance and humane transporting of livestock in which the vehicle is alternately suitable for the transporting of bulk particulate or granular matter, as well as other cargo comprising:
   a substantially rectangular shaped support platform including wheel means to allow movement of said support platform over a selected route and having a long dimension and a short dimension thereby defining a selected perimeter;
   an enclosing structure for housing livestock having a pair of side walls, a pair of end walls and a top wherein said side walls and end walls define a base with substantially the same shape as said selected perimeter, and which base joins to said support platform in a manner suitable for maintaining a closed environment, said enclosing structure defining at least one entryway to the interior of said enclosing structure, and a multiplicity of apertures for selectively providing light and ventilation to the interior of said enclosing structure, said enclosing structure further including means for closing said entryway and said multiplicity of apertures in a manner suitable for maintaining said closed environment;
   a lower support floor located above said support platform, said lower support floor having a lower first half and a lower second half, each of said lower first and second halves including an interior edge supported by said support platform between said pair of side walls such that upon rotation of said first and second halves of said lower support floor about said interior edges, both first and second halves of said lower support floor slope toward the center of said enclosure;
   lower support floor power actuators for rotating said lower first half and lower second half about said interior edges;
   auger means supported below and parallel to said lower support floor and further located between said interior edge of said lower first half and interior edge of said lower second half, said auger means for transporting particulate or granular material to a selected location in said vehicle;
   an environmental system for maintaining the temperature and other environmental parameters within said enclosed environment at preselected levels;
   a multiplicity of open containers secured to said side walls which allow free access by said livestock to feed and water contained in said open containers;
   first and second storage containers for storing food and water respectively;
   means for providing feed to selected ones of said multiplicity of open containers from said first storage container;
   means for providing water to other selected ones of said multiplicity of open containers from said second storage container; and
   master control means for controlling said environmental system, said means for providing feed, and said means for providing water.

2. The vehicle of claim 1 wherein said enclosing structure further includes human living quarters separate from said livestock.

3. The vehicle of claim 1 and further including an upper support floor located between said support platform and said top to separate said enclosing structure for housing livestock into compartments, said support floor suitable for supporting livestock thereby increasing the number of livestock which can be transported by said vehicle.

4. The vehicle of claim 3 wherein said upper support floor comprises an upper first half and an upper second half, and each half includes hinges mounted to opposite ones of said pair of side walls and further includes upper floor actuating means suitable for rotating said first and second halves of said upper support floor about said hinges such that said enclosing structure for housing livestock may be selectively altered from including upper and lower compartments to a single compartment only.

5. The vehicle of claim 4 wherein said upper floor actuating means, said lower support floor power actuators, and said auger means are controlled by said master control means.

6. The vehicle of claim 4 wherein said upper floor actuating means, said lower support floor actuators, and said auger means are controlled by said master control means.

7. The vehicle of claims 1, 2, or 4 wherein said storage container holding water is located in tanks below said support platform and is provided to selected ones of said open containers through pipes under pressure, and said storage container holding feed is below but proximate said top of said enclosing structure, and further including a conduit surrounding a feed auger for moving said feed to locations above other selected ones of said open containers such that said feed will be dumped into said other selected open containers.

8. The vehicle of claim 7 wherein said multiplicity of apertures for providing light and ventilation comprise power actuated windows controlled from said master control means.

9. The vehicle of claim 7 wherein said enclosure structure comprises an inner shell and an outer shell which contains an insulating material therebetween.

10. The vehicle of claims 1 or 4 wherein said multiplicity of said apertures for providing light and ventilation comprise power actuated windows controlled from said master control means.

11. The vehicle of claims 1, 2, or 4 wherein said enclosure comprises an inner shell and and outer shell which contains an insulation material therebetween.

12. The vehicle of claim 1 wherein said enclosing structure comprises an inner shell and and outer shell which contains an insulating material therebetween.

* * * * *